United States Patent [19]

Urakami et al.

[11] Patent Number: 5,124,551

[45] Date of Patent: * Jun. 23, 1992

[54] APPARATUS FOR MEASURING THE TEMPORAL CORRELATION OF FUNDAMENTAL PARTICLES

[75] Inventors: Tsuneyuki Urakami; Yoshihiro Takiguchi, both of Shizuoka, Japan

[73] Assignee: Hamamatsu Photonics Kabushiki Kaisha, Shizuoka, Japan

[*] Notice: The portion of the term of this patent subsequent to Oct. 30, 2007 has been disclaimed.

[21] Appl. No.: 578,221

[22] Filed: Sep. 26, 1990

Related U.S. Application Data

[63] Continuation of Ser. No. 246,106, Sep. 19, 1988, Pat. No. 4,967,080.

Foreign Application Priority Data

Sep. 18, 1987 [JP] Japan .................. 62-235365
Sep. 18, 1987 [JP] Japan .................. 62-235366

[51] Int. Cl.$^5$ ............................................. G01T 1/29
[52] U.S. Cl. ............................ 250/336.1; 250/213 VT
[58] Field of Search .............. 250/213 VT, 336.1, 394

[56] References Cited

U.S. PATENT DOCUMENTS 4,243,878  1/1981  Kalibjian ................. 250/213 VT
4,718,761  1/1988  Tsuchiya .................... 356/318
4,967,080  10/1990  Urakami et al. ............ 250/336.1

Primary Examiner—Constantine Hannaher
Attorney, Agent, or Firm—Finnegan, Henderson, Farabow, Garrett, and Dunner

[57] ABSTRACT

An apparatus for measuring the temporal correlation of fundamental particles such as photons, neutrons, X-rays or the like, comprising at least one deflector for sweeping the fundamental particles or images thereof in at least one direction, an aperture member having at least two apertures for time-divisionally extracting the swept fundamental particles or the images thereof, multiplication means, such as dynode groups or photomultipliers, for multiplying each of the extracted fundamental particles or the images thereof and a correlator for performing correlating arithmetic operations on the basis of each output signal from the multiplication means.

13 Claims, 5 Drawing Sheets

APPARATUS FOR MEASURING THE TEMPORAL CORRELATION OF FUNDAMENTAL PARTICLES

This is a continuation of application Ser. No. 07/246,106 filed Sep. 19, 1988, the contents of which are herein incorporated by reference, and issued as U.S. Pat. No. 4,967,080 on Oct. 30, 1990.

BACKGROUND OF THE INVENTION

The present invention relates to an apparatus for measuring the temporal correlation of photons, neutrons and other fundamental particles.

There has been known an apparatus for measuring the temporal correlation of photons detected from incident light.

The operating principle of the apparatus for measuring photon's temporal correlation is shown in FIG. 1. A photon beam is divided by a beam splitter 71 and the resulting two beams are directed into detectors 72 and 73. By changing the time-dependent parameter for each detector, the temporal correlation of photons can be measured with a correlator 74. Each of the detectors 72 and 73 comprises a photomultiplier tube, a semiconductor detector or the like.

If the respective distances from the beam splitter 71 to the detectors 72 and 73 are $l_1$ and $l_2$, the difference in arival time $\tau$ (the difference between the times at which photons arrive at the detectors 72 and 73) is expressed as:

$$\tau = (l_1 - l_2)/c \tag{1}$$

where c is the velocity of light. By measuring the probability that photons are simultaneously detected with detectors 72 and 73, the temporal correlation of photons within a time interval of $\tau$ can be determined.

FIG. 2 shows schematically a conventional apparatus for measuring temporal correlation using a single detector, or a photomultiplier tube 80. A photon passing through light attenuating filters 82 and a pinhole 81 is detected with the detector 80, for example a photomultiplier tube and the signal line after the detection is divided into two lines, one of which is delayed for determining the temporal correlation of photon with a correlator 83.

With the conventional temporal correlation measuring an apparatus as described above, photons to be measured are admitted into the detectors 72 and 73 or detector 80 in a direct way, namely, sequentially on a time basis. In order to obtain temporal correlation for a very short time difference of the order of subnanoseconds with this mechanical arrangement, not only the detectors 72 and 73 or detector 80 but also the correlator 74 or 83 is required to have high-speed response characteristics for providing a high time-resolving capability. However, in the the conventional technology, since the detectors 72 and 73 or detector 80 comprises a photomultiplier tube or semiconductor detector, the response speed thereof cannot be made faster than 10 picoseconds.

Further there also is a limit on the efforts that can be made to realize high-speed response with the circuits constituting the correlator 74 or 83.

As described above, the conventional temporal correlation measuring apparatus has a limited capability for determining temporal correlation for a very short time difference with high temporal resolution.

SUMMARY OF THE INVENTION

An object of the present invention is to provide an apparatus that is capable of measuring the temporal correlation of fundamental particles for short time difference of the order of subpicosecond with high temporal resolution.

Another object of the present invention is to provide an apparatus that is capable of measuring the temporal correlation of fundamental particles using a simplified processing system.

A further object of the present invention is to provide an apparatus that is capable of successively measuring the temporal correlation of fundamental particles while varying time differences.

The above objects are obtained by the provision of an apparatus according to this invention comprising: sweep means for sweeping fundamental particles or images thereof, extracting means for time-divisionally extracting the swept fundamental particles or images thereof through plural apertures formed in the extracting means, multiplication means for multiplying each of the fundamental particles or images thereof extracted through the apertures, and correlation means for performing correlating arithmetic operations on the basis of each output signal from the multiplication means.

The sweep means in the apparatus of the present invention sweeps fundamental particles such as photons, neutrons or the like or images thereof, for example, in the horizontal or vertical direction, or in the both directions. The swept particles or images thereof are extracted through plural apertures within a time difference that is determined by the sweep speed and the distance between apertures. The extracted fundamental particles or images thereof are multiplied by the multiplication means. The temporal correlation of fundamental particles is measured with the correlation means on the basis of each output signal from the multiplication means.

DETAILED DESCRIPTION OF THE INVENTION

Preferred embodiments of the present invention are described hereinafter with reference to the accompanying drawings.

Figure 1:
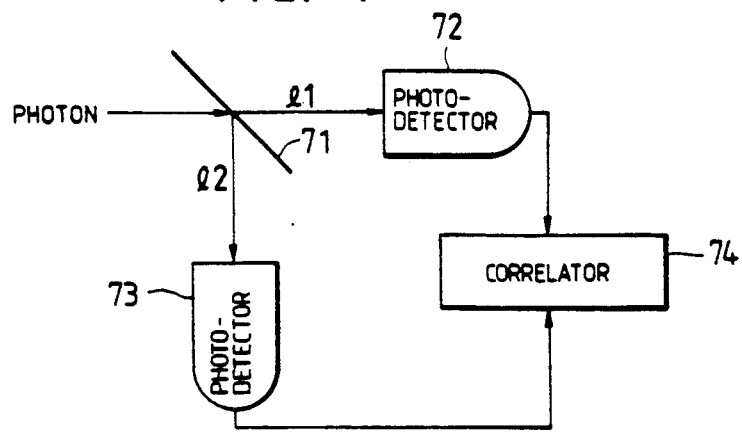
FIGS. 1 and 2 show schematically conventional apparatuses for measuring temporal correlation of fundamental particles.
Figure 2:
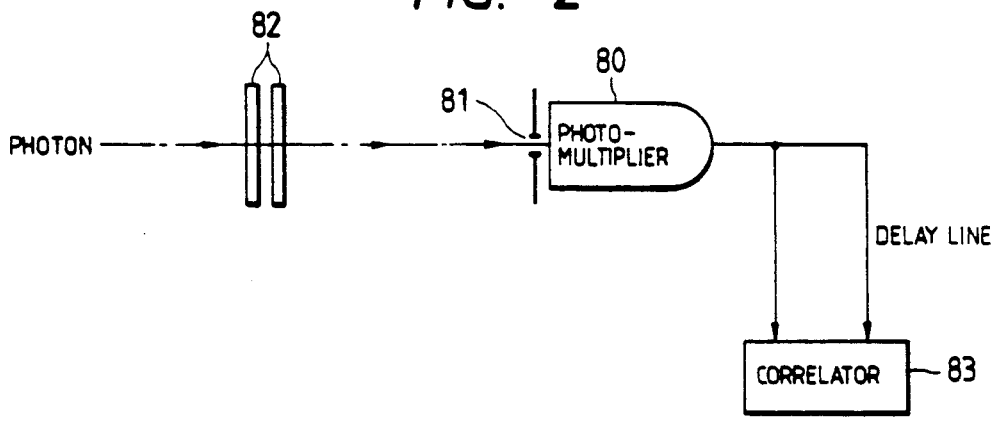
Figure 3:
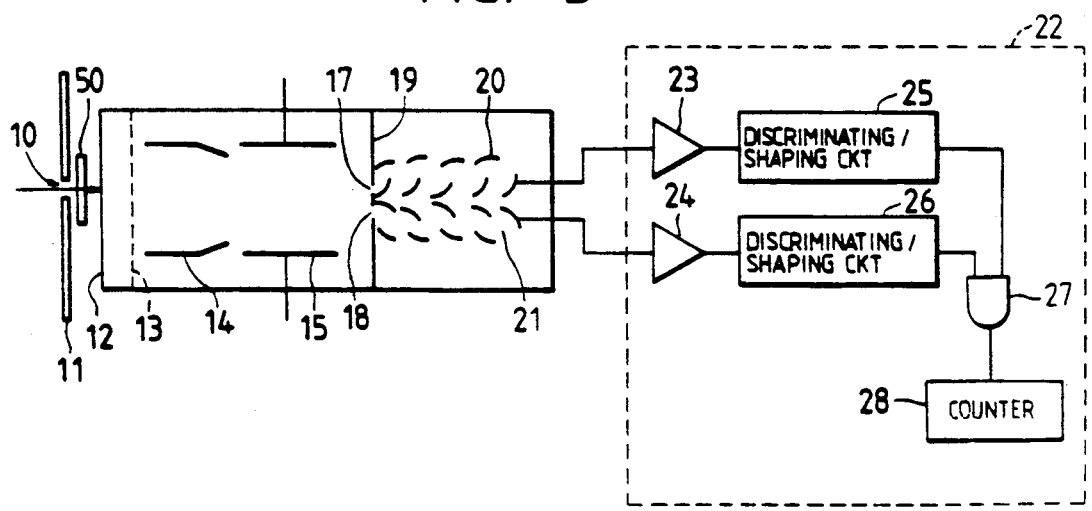
FIG. 3 shows schematically an apparatus for measuring temporal correlation of fundamental particles in accordance with a first embodiment of the present invention.

FIG. 3 is a schematic diagram for showing an apparatus for measuring the temporal correlation of fundamental particles according to a first embodiment of the present invention.

The apparatus as shown in FIG. 3 comprises a member 11 having an aperture 10 for guiding fundamental particles such as photons, neutrons, X-rays or the like, a fundamental particle-to-electron converting surface 12 such as a photocathode for receiving the fundamental particles that have passed through the aperture 10 and a focusing lens system 50, an accelerating electrode 13 for accelerating the electron image of fundamental particles from the surface 12, a focusing electrode 14 for focusing the accelerated electron image of fundamental particles, a deflector 15 for sweeping the electron image of fundamental particles, an aperture member 19 for extracting the swept electron image of fundamental particles through two apertures 17 and 18, two dynode groups 20 and 21 for respectively producing multiplied outputs of the electron images of fundamental particles extracted through the two apertures 17 and 18, and a correlator 22 for performing correlating arithmetic operations on the basis of each output signal from the two dynode groups 20 and 21.

The deflector 15 is designed to generate an electric field in response to an applied voltage, and comprises, for example, a pair of deflection plates.

Figure 4:
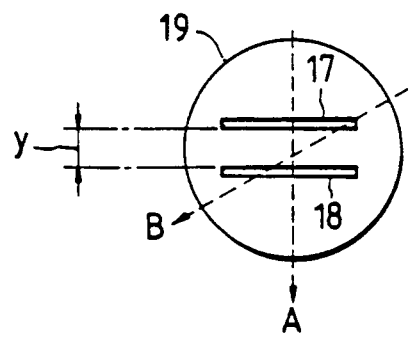
FIG. 4 shows schematically an aperture member as shown in FIG. 3.

The aperture member 19 has a structure as shown in FIG. 4, in which two apertures 17 and 18 are formed as parallel slits that are elongated in a given direction, for example, in a horizontal direction.

The correlator 22 comprises amplifiers 23 and 24 for amplifying the output signals from two dynode groups 20 and 21, discriminating/shaping circuits 25 and 26 for performing peak discrimination and waveform shaping of the output signals from the amplifiers 23 and 24, respectively, an AND circuit 27 for subjecting the two discriminated and shaped signals to an AND operation for determining correlation thereof, and a counter 28 for counting and storing the results of correlation as supplied from the AND circuit 27.

The operation of the apparatus having the construction as described above will proceed as follows. If fundamental particles such as photons pass through the aperture 10 and an image thereof is formed on the surface 12 by means of the focusing lens system 50, electrons will be emitted from the surface 12 and are admitted into the deflector 15 through the accelerating electrode 13 and the focusing electrode 14. The electrons are swept by the deflector 15 in a vertical direction as indicated by arrow A in FIG. 4, and are fed into the correlator 22 after having been amplified through two dynode groups 20 and 21 with a time difference proportional to the distance y (mm) between the two apertures 17 and 18 in the aperture member 19. If the deflector 15 is assumed to perform a sweeping operation at a rate of Vs (mm/psec) as measured on the aperture member 19, the time difference $\tau$, or the difference between the times at which electrons pass through two apertures 17 and 18, will be expressed as:

$$\tau = y/Vs \qquad (2)$$

Then, the correlator 22 is capable of obtaining temporal correlation for a time difference $\tau$ (in piscoseconds).

The AND circuit 27 in the correlator 22 produces a high-level output only when it is simultaneously supplied with the output signals from the discriminating/shaping circuits 25 and 26, and the so produced high-level outputs are successively counted by the counter 28 to produce a desired temporal correlation.

As described above, the apparatus as shown in FIG. 3 converts successive incident particles into their respective electron images, sweeps the electrons vertically with the deflector 15, and time-divisionally extracts the swept electrons through the two apertures 17 and 18 for measuring the temporal correlation between extracted electrons. Because of this arrangement, the dynode groups 20 and 21 and the correlator 22 need not have a particularly high response speed to realize highly efficient time-resolved correlation for a very short time difference. The time difference necessary to attain temporal correlation is determined by the sweep speed of the deflector 15 and the distance between two apertures 17 and 18, but it is not dependent on the temporal resolution of the processing system behind the aperture plate 19, which comprises the dynode groups 20 and 21 and the correlator 22. Therefore, temporal correlation for a very short time difference of the order of sub-picoseconds can be measured with high temporal resolution. In this connection, it should be mentioned that temporal correlation for varying time differences can be obtained by changing the sweep speed of the deflector 15.

A further advantage of the apparatus of the above embodiment of the present invention is that the construction of the processing system can be simplified since one only needs to determine the temporal correlation of the output signals from the two apertures 17 and 18.

Figure 5:
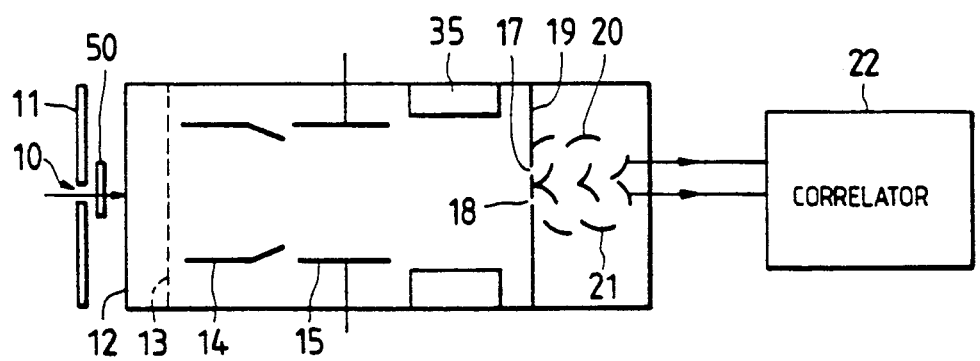
FIG. 5 shows a second embodiment of the apparatus as shown in FIG. 3.

FIG. 5 shows a modification of the apparatus as shown in FIG. 3. The apparatus as shown in FIG. 5 has an electronic lens system 35 between the deflector 15 and the aperture member 19. If the electronic lens system 35 is of an enlarging type, temporal correlation for varying time differences can be obtained by changing the magnifying power of the lens system instead of changing the sweep rate of the deflector 15. If the enlarging electronic lens system is to be attached to an image intensifier, it may be disposed in front of the latter. Alternatively, it may be adapted to serve both as an electronic lens system and as an image intensifier. If the electronic lens system 35 is designed as an electron image rotating type, the direction in which electrons are swept can be altered. An example of this change in electron sweeping direction is shown in FIG. 4, in which the sweep direction indicated by arrow A which is peculiar to the deflector 15 is rotated to the direction indicated by arrow B. As a result of this change in sweep direction, the effective distance between apertures 17 and 18 is sufficiently changed to measure temporal correlation while varying the time difference. In this way, a desired temporal correlation can be obtained in the apparatus as shown in FIG. 5 through proper control of the magnification and direction of sweeping.

Figure 6:
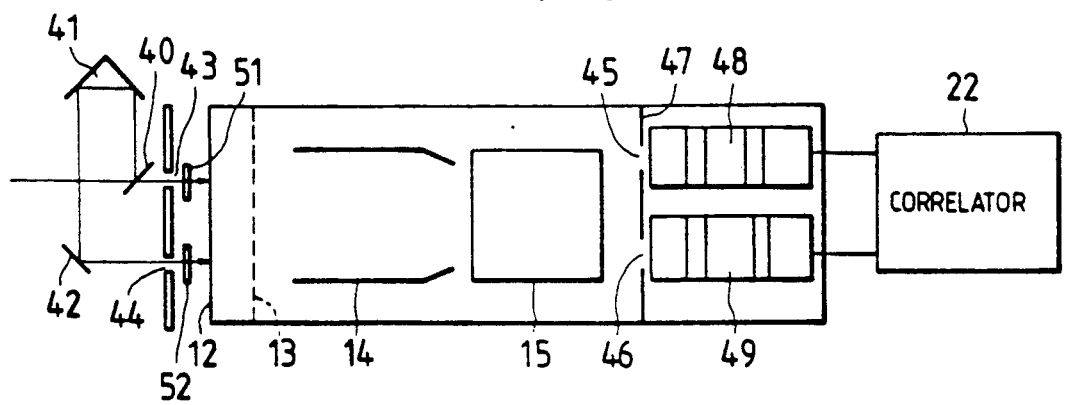
FIG. 6 shows a third embodiment of the apparatus as shown in FIG. 3.
Figure 7:
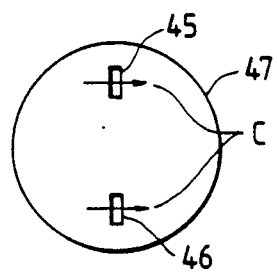
FIG. 7 shows schematically another aperture member employed in the apparatus of the third embodiment.

The purpose of performing the temporal correlation measurement with variable time differences, can also be attained by the design as shown in FIGS. 6 and 7 instead of using the electronic lens system 35. As shown in FIG. 6, incident light is divided into two beams by a beam splitter 40. One of the resulting beams passes through an aperture 43 and a focusing lens system 51, from which it is directly guided to the fundamental particle-to-electron converting surface 12. The other beam is delayed in time through a delay means 41 and a mirror 42 and thereafter passes through an aperture 44 and a focusing lens system 52, from which it is guided to the surface 12. Electrons are emitted from the surface 12 at the positions where it has been struck with the incident fundamental particles such as photons and they pass through the accelerating electrode 13 and the focusing electrode 14 to be swept by the deflector 15. The swept electrons are time-divisionally extracted through two apertures 45 and 46 in an aperture member 47. The two extracted electrons are multiplied with dynode groups 48 and 49, respectively, and the output from each dynode group is supplied into the correlator 22 for determining temporal correlation. The aperture member 47 has apertures as shown in FIG. 7 and electrons that have been swept by the deflector 15 in the direction indicated by arrow C are extracted through the apertures 45 and 46.

As described above, the apparatus as shown in FIGS. 6 and 7 controls time difference with the delay means 41 so as to obtain temporal correlation of fundamental particles as photons, while varying time differences.

Figure 8:
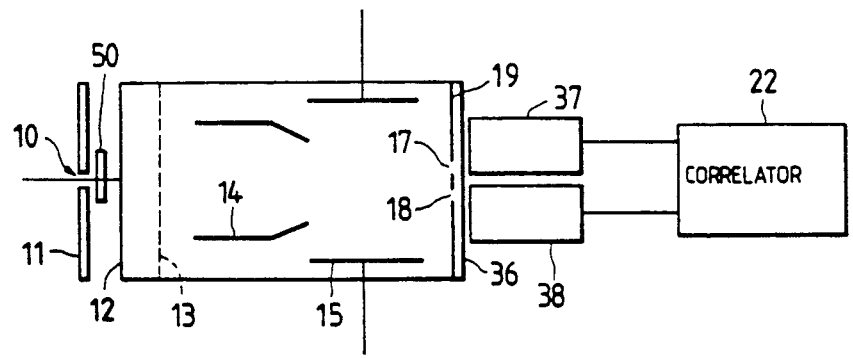
FIG. 8 shows a fourth embodiment of the apparatus as shown in FIG. 3.

With reference to FIG. 3, the dynode groups 20 and 21 serving as multiplication means are accommodated in a single tube together with the deflector 15 and the aperture member 19. An alternative to this arrangement is shown in FIG. 8, in which a phosphor screen 36 is disposed behind an aperture member 19 and photomultiplier tubes 37 and 38 are disposed behind the phosphor screen 36 at positions that are associated with the apertures 17 and 18, respectively. In this arrangement, electrons that have passed through the two apertures 17 and 18 are incident to the phosphor screen 36 and photons that are generated from the screen are supplied into photomultiplier tubes 37 and 38, which produce output signals to be fed into the correlator 22.

The apertures 17 and 18 as shown in FIG. 4 are in the form of parallel slits that are elongated in a horizontal direction. If desired, these apertures may be arranged in such a manner that they are elongated at a certain angle with respect to the horizontal direction.

The foregoing embodiments assumes that the deflector 15 sweeps electrons in a vertical direction but this is not the only way of an electron sweeping operation, and electrons may be swept in any direction so long as they can traverse the two apertures 17 and 18.

Figure 9:
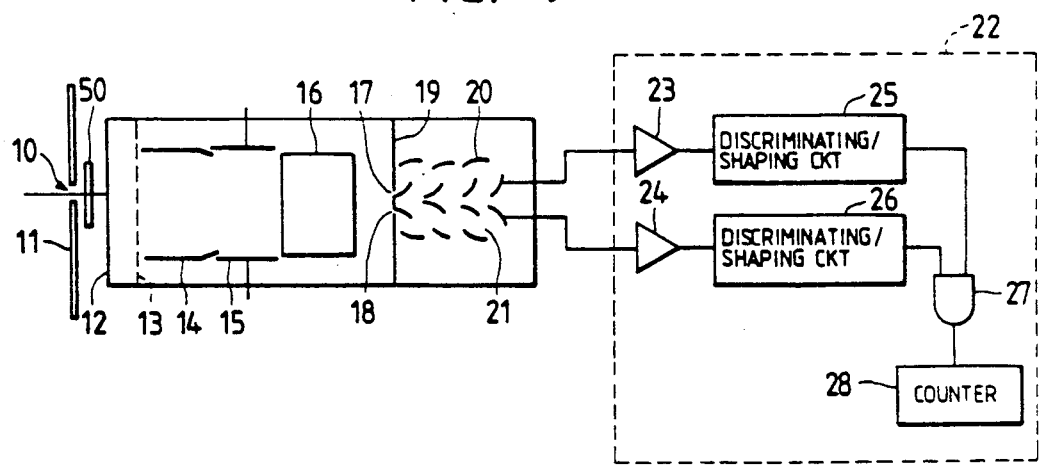
FIG. 9 shows a fifth embodiment of the present invention.

FIG. 9 is a schematic diagram for showing the apparatus according to a fifth embodiment of the invention.

The apparatus as shown in FIG. 9 has the basically same construction as that of the apparatus as shown in FIG. 3, except for some components thereof. Accordingly, the components which correspond to those as shown in FIG. 3 are identified by like numerals, and will not be described in detail.

Figure 10:
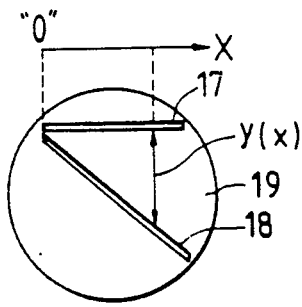
FIG. 10 shows schematically the aperture member as used in the apparatus as shown in FIG. 9.

In addition to the components as shown in FIG. 3, the apparatus of the fifth embodiment is provided with another deflector 16 for sweeping the electron images of fundamental particles in the direction different from that of the deflector 15, for example, in the horizontal direction, and an aperture member 19' having apertures 17' and 18' as shown in FIG. 10. The deflector 16 is also designed to generate an electric field in response to an applied voltage, and comprises, for example, a pair of deflection plates. The apertures 17' and 18' are formed in the aperture member 19' in such a manner that the distance y(x) (mm) therebetween increases progressively as the value (x) of a position in a horizontal direction increases.

The operation of the apparatus having the construction as described above will proceed as follows. If fundamental particles such as photons pass through the aperture 10 and an image thereof is formed on the surface 12 by means of the focusing lens system 50, electrons will be emitted from the surface 12 and are incident on the aperture member 19 through the accelerating electrode 13, the focusing electrode 14 and the deflectors 15 and 16. If the deflector 16 is initialized in such a manner that an electron will first encounter the aperture member 19' at a horizontal position x="0", the electron that has been swept vertically by the deflector 15 will pass through the two apertures 17' and 18' at position y(0) (mm) where the distance between these two apertures is the smallest. If the voltage applied to the deflector 16 is gradually changed so as to shift successively the horizontal position x where electrons are incident on the aperture member 19', the electron swept vertically by the deflector 15 will each time be supplied to the correlator 22 through two dynode groups 20 and 21 with a time difference proportional to the distance y(x) (mm) between the two apertures 17' and 18' in the aperture member 19'. If the deflector 15 is assumed to perform a sweeping operation at a rage of Vs (mm/psec) as measured on the aperture member 19', the time difference $\tau$, or the difference between the times at which electrons pass through two apertures 17' and 18', will be expressed as:

$$\tau = y(x)/Vs \quad (3)$$

Therefore, by successively shifting the horizontal position x with the deflector 16, temporal correlations can be successively obtained with the correlator 22 while varying values of time difference $\tau$.

Figure 11:
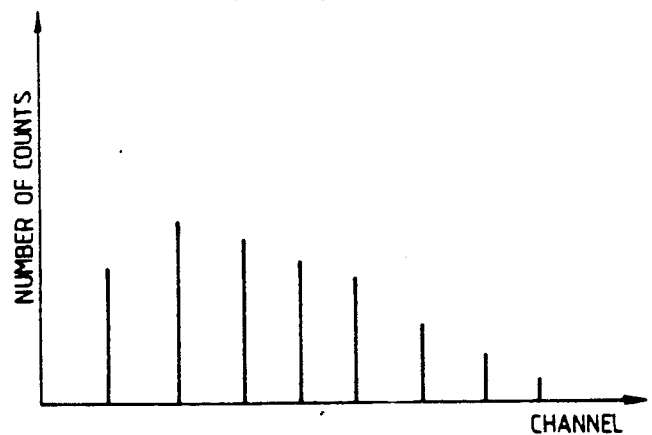
FIG. 11 is a graph showing the results of correlation measurement.

The AND circuit 27 in the correlator 22 produces a high-level output only when it is simultaneously supplied with the output signals from the discriminating/shaping circuits 25 and 26, and the high-level outputs thus produced are successively counted by the counter 28 to produce a desired temporal correlation. High operational efficiency can be achieved by employing a multi-channel counter as counter 28, which is scanned in synchronism with the horizontally-deflecting operation of the deflector 16 for shifting the horizontal position x of electrons. The results of correlation stored in this way in the multichannel counter are shown in FIG. 11, where each channel corresponds to time difference $\tau$.

If electrons are swept horizontally by the deflector 16 with the distance y(x) (mm) between electron extracting apertures 17' and 18' being successively changed, temporal correlations for a broad spectrum of a short time-differences ranging from the order of subpicoseconds to a much longer time-difference can be continuously measured with high temporal resolution, in addition to the performances obtained by the apparatus as shown in FIG. 3.

Figure 12:
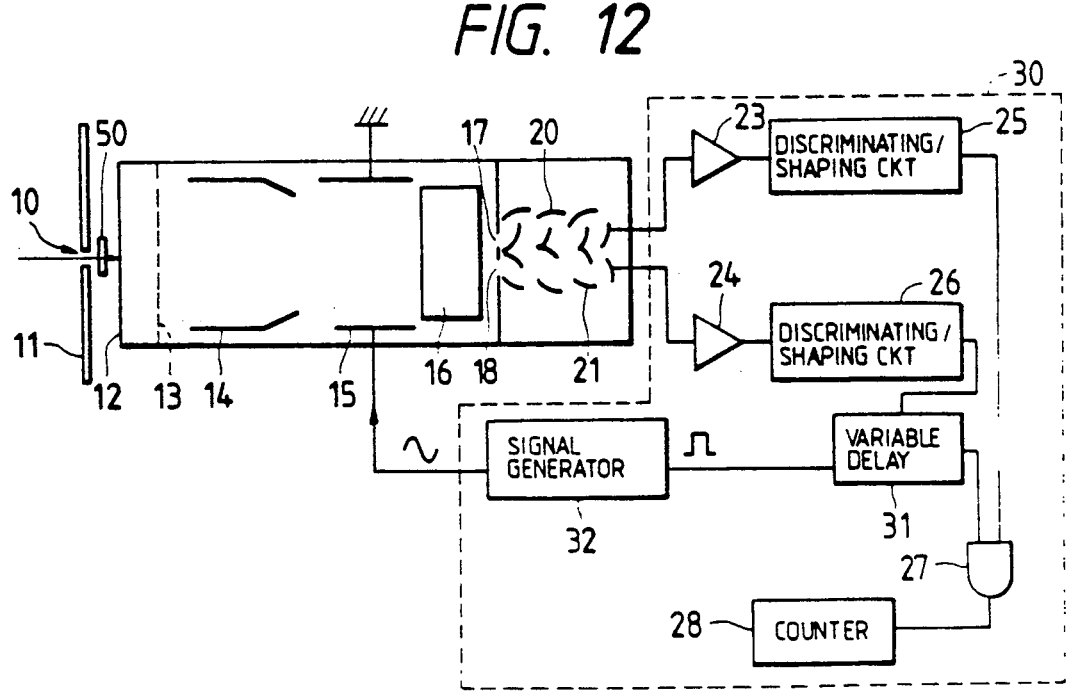
FIG. 12 shows a sixth embodiment of the present invention.

FIG. 12 is a schematic diagram as showing an apparatus for measuring the temporal correlation of fundamental particles according to a sixth embodiment of the present invention. In FIG. 12, the components which correspond to those as shown in FIG. 9 are identified by like numerals and will not be described in detail.

The apparatus according to the sixth embodiment of the present invention includes a correlator 30 in which the output signal that has been multiplied by one dynode group, for example, the dynode group 21, is supplied to a variable delay 31 through amplifier 24 and discriminating/shaping circuit 26, and the signal supplied to the delay circuit 31 is further delayed for a certain time before it is fed into the AND circuit 27. The variable delay circuit 31 may be composed of a shift register which further delays the output signal from the discriminating/shaping circuit 26 by an amount equal to the product of the sweep period of deflector 15 as determined by the signal from a signal generator 32 and the number of count settings.

If the sweep period of the deflector 15 is 10 nanoseconds and the number of count settings on the variable delay circuit 31 is "3", the arrangement as shown in FIG. 12 will cause the output signal from the discriminating/shaping circuit 26 to be further delayed for 30 nanoseconds. In other words, the two output signals from the discriminating/shaping circuits 25 and 26 will be supplied into the AND circuit 27 with a time difference of $(30+\tau)$ nanoseconds, where $\tau$ is the time difference determined by the sweep rate and the distance between apertures 17' and 18'.

As is apparent from the above description, the apparatus according to the sixth embodiment of the present invention offers the advantage that it also has a capability of measuring temporal correlation for a longer time difference.

Figure 13:
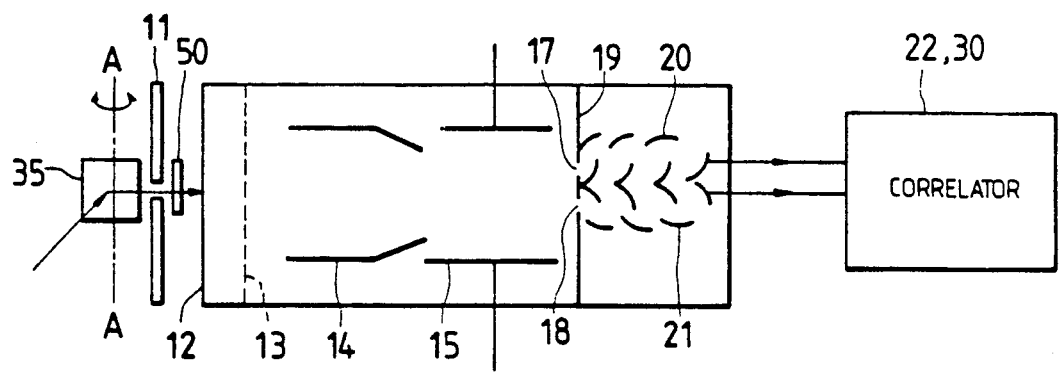
FIGS. 13 and 14 show seventh and eighth embodiments of the apparatus of the present invention.

In the fifth and sixth embodiments as described above, electrons are shifted horizontally by means of the deflector 16. However, it should be noted that the same result can be attained by provision of a mirror 35 as shown in FIG. 13, which is shifted in the direction perpendicular to an axial line A—A, that is, in the direction perpendicular to the surface of the drawing, alternatively is rotated about the axial line A—A. In a case where the mirror 35 is rotated, an $f\theta$ lens should be provided between the mirror 35 and the member 11. If no $f\theta$ lens is provided, the amount of the incident fundamental particles to the aperture 10 of the member 11 is varied in accordance with a rotation angle of the mirror 35, and this is not preferable for measurement. The provision of the $f\theta$ lens can prevent the variation in the amount of the fundamental particles with the rotation angle of the mirror 35.

In the embodiments as described above, the member 11 having aperture 10 is disposed in front of the fundamental particle-to-electron converting surface 12. If desired, an aperture may be provided in the accelerating electrode 13; this offers the advantage of eliminating the member 11 without causing a decrease in efficiency on account of the open ratio of the accelerating electrode.

Figure 14:
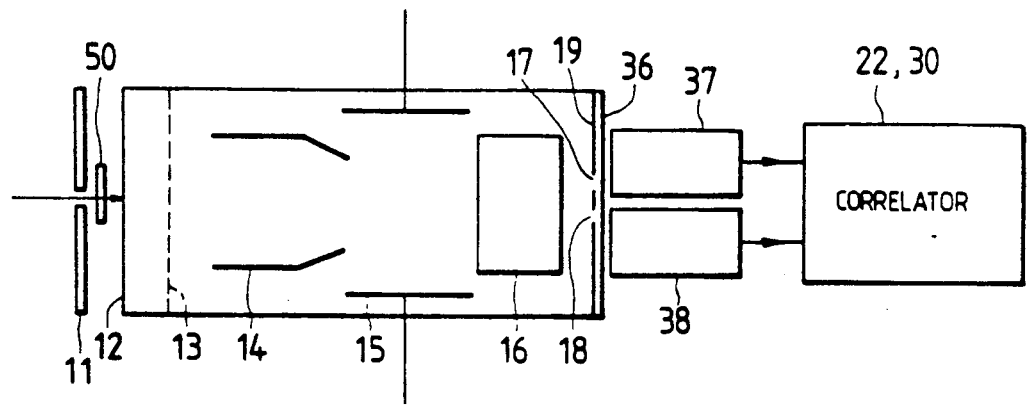

With reference to FIG. 9, the dynode groups 20 and 21 serving as multiplication means are accommodated in a single tube together with the deflectors 15 and 16 and the aperture member 19'. Alternatively, the arrangement as shown in FIG. 14 may be applied, in which a phosphor screen 36 is disposed behind an aperture member 19' and photomultiplier tube 37 and 38 are disposed behind the phosphor screen 36 so that the photomultiplier tubes 37 and 38 correspond to the apertures 17' and 18', respectively. In this arrangement, electrons that have passed through the two apertures 17' and 18' strike the phosphor screen 36, and photons generated from the phosphor screen are supplied into photomultiplier tubes 37 and 38 and outputted as output signals to the correlators 22 and 30.

In FIG. 10, the aperture 17' is designed in a slit form which is elongated in a horizontal direction, but this is not necessarily the case. The aperture may be elongated at a certain angle with respect to the horizontal direction.

The foregoing description assumes that electrons are swept in both horizontal and vertical directions, but this is not necessarily the case. Electrons may be swept in other directions so long as they differ from each other.

If temporal correlation of X-rays is to be determined, the fundamental particle-to-electron converting surface 12 is preferably made of Au or CsI, and for determining temporal correlation of neutrons, the surface 12 is preferably made of $U_2O_3$, $U_3O_8$, or the like.

In all of the embodiments as described above, incident fundamental particles are converted to their respective images by the surface 12 and the resulting images (electrons) are swept by the deflector 15 or the deflectors 15 and 16. Alternatively, an electrooptical crystal may be employed in such a manner that a change in its refractive index in response to an applied voltage is utilized to perform a direct sweeping of photons. The deflectors 15 and 16 may be designed to generate a magnetic field instead of an electric field.

Further, in all of the embodiments as described above, the member 11 having aperture 10 is disposed in front of the fundamental particle-to-electron converting surface 12. If desired, an aperature may be provided in the accelerating electrode 13; this offers the advantage of eliminating the member 11 without causing a decrease in efficiency on account of the open ratio of the accelerating electrode.

As described above, the apparatus of the present invention is so designed that fundamental particles or images thereof which have been swept are time-divisionally extracted with two or more apertures, and arithmetic operations are performed on the extracted fundamental particles or images thereof for obtaining their temporal correlation. This design offers the advantage that temporal correlation for a very short time difference of the order of subpicoseconds can be obtained with high temporal resolution. A further advantage of the present invention is that such a subpicosecond time-resolved correlation measurement can be accomplished using a simplified processing system. In addition, the present invention enables temporal correlations to be measured successively while varying time differences.

What is claimed is:

1. An apparatus for measuring the temporal correlation of fundamental particles comprising:
   Sweep means for sweeping the fundamental particles or images thereof,
   extracting means for time-divisionally extracting the swept fundamental particles or the images thereof,
   multiplication means for multiplying each of the extracted fundamental particles or the images thereof, and
   Correlation means for performing correlating arithmetic operations on the basis of each output signal from said multiplication means.

2. An apparatus as claimed in claim 1, wherein said extracting means comprises an aperture member having at least two apertures, the fundamental particles or images thereof being time-divisionally extracted through said apertures.

3. An apparatus as claimed in claim 1, wherein said multiplication means comprises dynode groups for respectively producing multiplied output signals from the image of said fundamental particles time-divisionally extracted through said extracting means.

4. An apparatus as claimed in claim 1, wherein said multiplication means comprises photomultiplier tubes for respectively producing multiplied output signals from the fundamental particles or images through time-divisionally extracted through said extracting means.

5. An apparatus for measuring the temporal correlation of fundamental particles comprising:
fundamental particle-to-electron converting means for converting fundamental particles to electrons,
accelerating means for accelerating the electrons,
focusing means for focusing the accelerated electrons,
deflecting means for sweeping the electrons in at least one direction,
extracting means having at least two apertures for extracting the swept electrons,
multiplication means for multiplying the electrons extracted through said extracting means, and
correlation means for performing correlating arithmetic operations on the basis of each output signal from said multiplication means.

6. An apparatus as claimed in claim 5, wherein said multiplication means comprises at least two dynode groups for respectively multiplying the electrons extracted through said extracting means.

7. An apparatus as claimed in claim 5, wherein said multiplication means comprises a phosphor screen for converting electron images extracted from said apertures of said extracting means to the corresponding light images, and at least two photomultipliers for respectively producing multiplied output signals corresponding to the light images.

8. An apparatus for measuring the temporal correlation of fundamental particles comprising:
fundamental particle-to-electron converting means for converting fundamental particles to electrons;
accelerating means for accelerating the electrons;
focusing means for focusing the accelerated electrons;
deflecting means for sweeping the electrons in at least one direction;
extracting means having two apertures for extracting the swept electrons, the apertures being elongated along respective axes and relatively oriented to provide a variable distance between said axes;
multiplication means for multiplying the electrons extracted through the extracting means; and
correlation means for performing correlating arithmetic operations on the basis of each output signal from the multiplication means.

9. An apparatus as claimed in claim 8, wherein the multiplication means includes
two dynode groups for respectively multiplying the electrons extracted through the extracting means.

10. An apparatus as claimed in claim 8, wherein the multiplication means includes
a phosphor screen for converting electron images extracted from the apertures of the extracting means to corresponding light images; and
two photomultipliers for respectively producing multiplied output signals corresponding to the light images.

11. An apparatus for measuring the temporal correlation of fundamental particles comprising:
fundamental particle-to-electron converting means for converting fundamental particles to electrons;
accelerating means for accelerating the electrons;
focusing means for focusing the accelerated electrons;
deflecting means for sweeping the electrons in at least one direction;
extracting means having two apertures for extracting the swept electrons, the apertures being elongated along axes paralleled with each other;
multiplication means for multiplying the electrons extracted through the extracting means; and
correlation means for performing correlating arithmetic operations on the basis of each output signal from the multiplication means.

12. An apparatus as claimed in claim 11, wherein the multiplication means includes
two dynode groups for respectively multiplying the electrons extracted through the extracting means.

13. An apparatus as claimed in claim 11, wherein the multiplication means includes
a phosphor screen for converting electron images extracted from the apertures of the extracting means to corresponding light images; and
two photomultipliers for respectively producing multiplied output signals corresponding to the light images.

* * * * *

UNITED STATES PATENT AND TRADEMARK OFFICE
CERTIFICATE OF CORRECTION

PATENT NO. : 5,124,551

DATED : June 23, 1991

INVENTOR(S) : Tsuneyuki Urakami et al.

It is certified that error appears in the above-identified patent and that said Letters Patent is hereby corrected as shown below:

On title page, item [22], change "Sept. 26, 1990" to --Sep. 6, 1990--.

Claim 1, column 8, line 54, change "Sweep" to --sweep--.

Claim 1, column 8, line 61, change "Correlation" to --correlation--.

Claim 4, column 9, line 9, change "from" to --of--.

Signed and Sealed this

Fifth Day of October, 1993

Attest:

BRUCE LEHMAN

*Attesting Officer*     *Commissioner of Patents and Trademarks*